United States Patent [19]

Benedict

[11] Patent Number: 4,528,752

[45] Date of Patent: Jul. 16, 1985

[54] GLASS CUTTER

[76] Inventor: Mellen-Thomas Benedict, 1702 Swann St., Fayetteville, N.C. 28303

[21] Appl. No.: 646,464

[22] Filed: Sep. 4, 1984

Related U.S. Application Data

[63] Continuation of Ser. No. 430,760, Sep. 30, 1982, abandoned.

[51] Int. Cl.[3] .......................... B26D 3/12; B26D 3/08; B26D 1/00

[52] U.S. Cl. .................................. 30/164.95; 30/343; 30/296 R

[58] Field of Search ...................... 30/164.95, 296, 343; 24/164

[56] References Cited

U.S. PATENT DOCUMENTS

| | | | |
|---|---|---|---|
| 434,676 | 8/1890 | Newton | 30/343 |
| 2,265,955 | 12/1941 | Roberts et al. | 30/164.95 |
| 2,520,355 | 8/1950 | Bell | 30/343 |
| 4,161,819 | 7/1979 | Pietrantonio | 24/164 |
| 4,205,438 | 6/1980 | Sikorski | 30/164.95 |
| 4,224,738 | 9/1980 | Magewick et al. | 30/164.94 |
| 4,380,122 | 4/1983 | Jagger | 30/296 |

FOREIGN PATENT DOCUMENTS

| | | | |
|---|---|---|---|
| 2637172 | 2/1978 | Fed. Rep. of Germany | 30/343 |

*Primary Examiner*—Paul A. Bell
*Assistant Examiner*—Paul M. Heyrana, Jr.
*Attorney, Agent, or Firm*—David Rabin

[57] ABSTRACT

A glass cutter having an upwardly inclined shank extending into a handle at one end for supporting the glass cutter with a cutter housing at the other end of the shank. A bulbous horn for cooperatively receiving the end of the index finger extends from the cutter housing at an angle to the shank for supporting and guiding the circular disk in the cutter head with the hand grip.

8 Claims, 15 Drawing Figures

GLASS CUTTER

This is a continuation application of parent application Ser. No. 06/430,760 filed on Sept. 30, 1982 for a GLASS CUTTER, now abandoned.

BACKGROUND AND OBJECTIVES OF THE PRESENT INVENTION

Various types of glass cutters have been utilized for scoring glass for straight or linear lines as well as for intricate contours. However, it has been extremely difficult to control the cutting wheel using a hand manipulated glass cutter particularly without a guide or template.

Futhermore, it is highly desirable to sever the glass shortly after it has been cut rather than await a prolonged period before attempting severance. In some instances, a spherical ball is provided on the handle of a cutter which may be used to tap the fresh cut in the glass to sever along the fresh cut. In some instances, a separate small hammer or other tool may be used to strike the cut in order to sever along the cut line by a tapping action.

It is an objective of the present invention to provide a glass cutter that provides superior control during cutting by positioning the index finger directly above the cutting wheel and exerting pressure downwardly on the wheel which engages the glass to be cut.

Another objective of the present invention is to provide a glass cutter in which the handle may be gripped by the palm of the user to steady the glass cutter while exerting a downward force by using the forefinger in alignment with the cutter head to control the direction of cutting of the glass cutter wheel.

Yet another objective of the present invention is to provide a unitary glass cutter handle in which a tapping horn is provided adjacent to the cutting head of the glass cutter permitting the use of the handle for leverage.

Still a further objective of this invention is to provide a glass cutter handle that will comfortably fit into the palm of the user for protracted use with minimum fatigue and increased cutting accuracy with ease of manipulation.

Other objectives and many of the attendant advantages of this glass cutter will be more readily apparent to those skilled in the glass cutting art from the accompanying drawing, specification and claims in which modifications and mechanical equivalents are contemplated.

BRIEF DESCRIPTION OF DRAWING OF PREFERRED EMBODIMENTS

DETAILED DESCRIPTION OF PREFERRED EMBODIMENTS OF THE INVENTION

Figure 1:
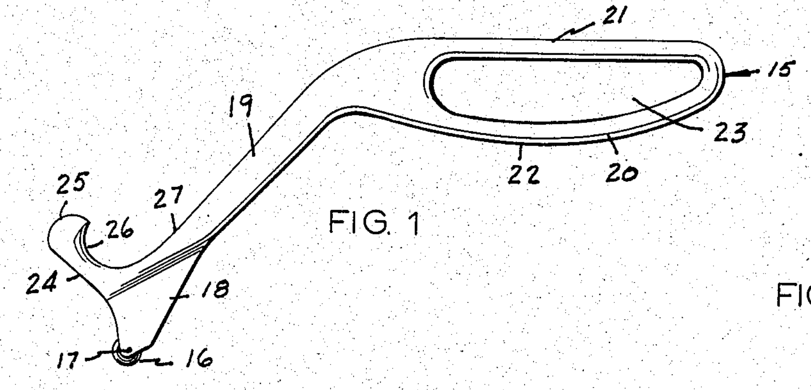
FIG. 1 is a front elevational view of a glass cutter embodying my invention.
Figure 4:
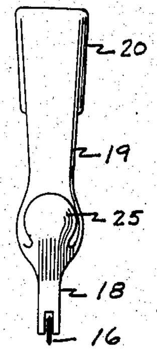
FIG. 4 is a left side view of FIG. 1.
Figure 5:
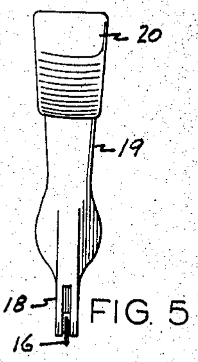
FIG. 5 is a right side view of FIG. 1.
Figure 2:
FIG. 2 is a top plan view of FIG. 1.
Figure 3:
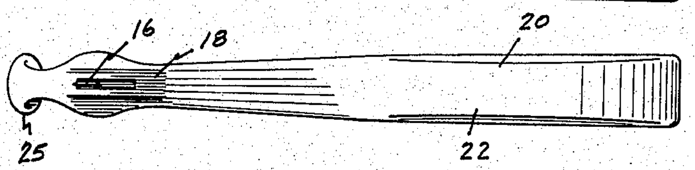
FIG. 3 is a bottom plan view of FIG. 1.

Referring to the drawing and particularly to FIGS. 1–5, there is shown one preferred embodiment of a glass cutter 15 of integral construction which may be molded, cast, forged or machined to the proper contour and in which the cutter disk or wheel 16 is rotably mounted on the stub shaft 17 that is supported on the truncated downwardly converging housing 18 which extends from the shank 19 that extends upwardly at an angle of substantially forty-five degrees (45°) from the horizontal and to which shank 19 a substantially horizontal palm gripping handle 20 is formed with the upper section 21 that fits comfortably into the palm of the cutter user and is substantially linear. The lower section 22 of the handle frame is arcuate to fit the finger grip of the cutter user. The elongated and partially elliptical opening 23 provides improved balance, comfortable fit and a discontinuous surface that will reduce perspiration and possible sliding of the handle in the grip of the cutter user.

An upwardly extending horn-like hammer 24 projects at an angle of approximately forty five degrees (45°) from the horizontal and has at its terminal end a partial spherical head 25 which may be used to tap the cut in the glass to sever the pieces using the handle 20 and the shank 19 as a handle and lever for the horn-like hammerhead 25. An index finger tip-receiving contour 26 is provided in the upper portion 27 of the shank 19 and into the neck portion of the projecting hammer horn 24 for cooperatively receiving the tip of the index or forefinger for guiding the cutter 16 and applying suitable pressure directly over the cutter in its path of travel.

The embodiments shown in FIGS. 6–10, and 11–15 are modifications of the handle portion primarily and only the differences in the handle portions will be described in detail when the shank 19, the index finger recess 26, the cutter wheel 16, cutter housing and horn hammer 25 are substantially the same in the other preferred embodiments and will not be discussed in detail and will include the same reference characters, where included.

Figure 6:
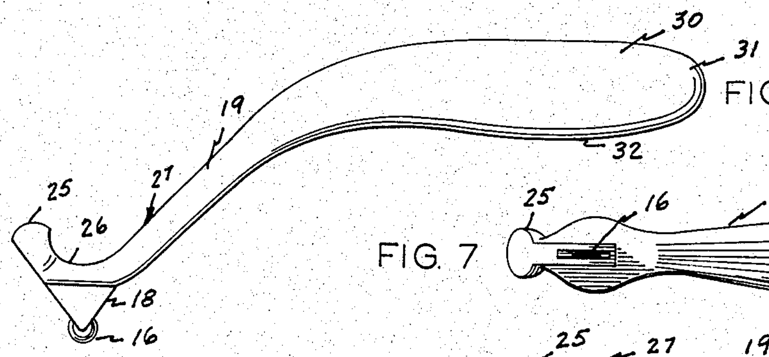
FIG. 6 is a front view of a modified glass cutter embodying my invention.
Figure 7:
FIG. 7 is a bottom plan view of FIG. 6.
Figure 8:
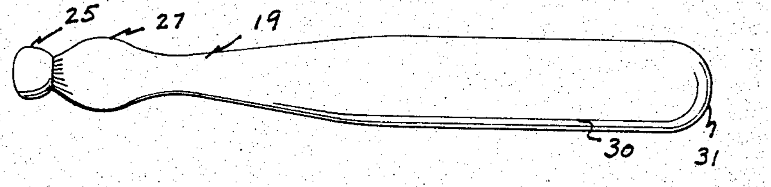
FIG. 8 is a top plan view of FIG. 6.
Figure 9:
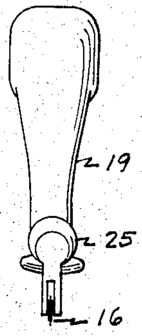
FIG. 9 is a left end view of FIG. 6.
Figure 10:
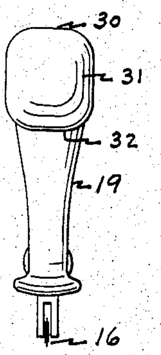
FIG. 10 is a right end view of FIG. 6.
Figure 11:
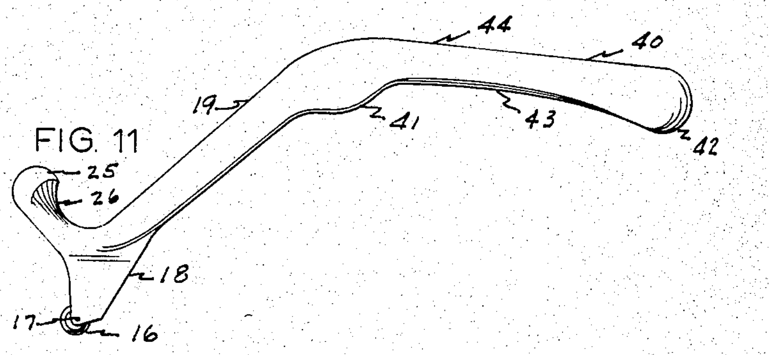
FIG. 11 is a front view of a further modified glass cutter embodying my invention.
Figure 12:
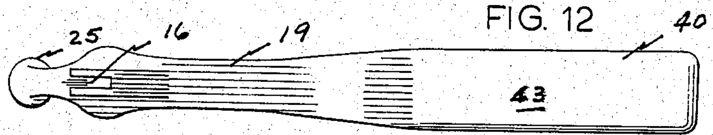
FIG. 12 is a bottom plan view of FIG. 11.
Figure 13:
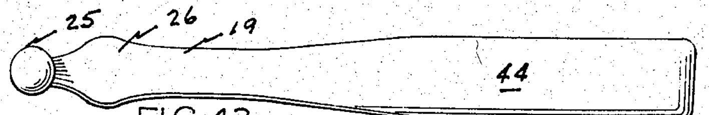
FIG. 13 is a top plan view of FIG. 11.
Figure 15:
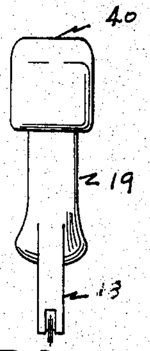
FIG. 15 is a right end view of FIG. 11.
Figure 14:
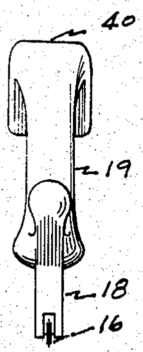
FIG. 14 is a left end view of FIG. 11.

The handle 30 in the cutter shown in FIG. 6 and the related FIGS. 7–10, is preferably rounded and elongated so that it will fit comfortably into the palm of the user's hand while permitting the index finger to reach forwardly along the shank 19 to be seated in the index finger tip receiving recess or well 26. The rear section 31 of the handle is rounded and the bottom of the handle 32 and the sides are also rounded and converge forwardly with the tapered shank 19.

The glass cutter shown in FIGS. 11–15 is provided with a solid handle 40 which is integrally formed with the shank 19 and is provided with an enlarged medial section 41 and an enlarged rounded end portion 42 with a tapered or inwardly arcuate central section 43 for cooperatively receiving the palm on the rounded upper surface 44 of handle 40 with the index finger being positioned along the top surface of shank 19 with the tip of the index finger resting within the recess 26 below the horn hammer 25. The thumb may engage the protrusion or enlarged section 41 while the remaining fingers grasp the handle within the medial section 43.

Each embodiment of the glass cutter is adequately balanced usually at the juncture of the shank and the handle. The actual angle of inclination of the shank may vary but optimum results have been achieved in the range of from thirty degrees (30°) to sixty degrees (60°) and preferably the handle gripping portion is horizontal in the positions for the cutters shown in FIGS. 1, 6 and 11.

The cutter wheel 16 may be readily removed and replaced by removing the stub shaft 17 and replacing the wheel 16 which is preferably made of carbide steel.

I claim:

1. A hand manipulable glass cutter having a cutter support housing, a circular cutter rotatably mounted in said housing, an inclined shank supporting said cutter housing in the cutting position, a handle projecting substantially horizontal from said shank for being gripped by the hand of a glass cutter user, and means in alignment with said shank for receiving the grip of the user's four fingers whereby controlled guidance and force may be exerted on said cutter housing and cutter by the user's hand, said means including a forefinger tip-receiving arcuate recess in spaced aligned relation to said shank above said cutter housing.

2. A hand manipulable glass cutter as claimed in claim 1, and means extending from said shank opposite from said cutter for tapping a scored glass.

3. A hand manipulable glass cutter as claimed in claim 1, and an upwardly extending horn hammer having a partially spherical head projecting from said shank at an angle thereto opposite from said cutter housing.

4. A hand manipulable glass cutter as claimed in claim 1, said handle having a hand grip, said hand grip having an upper palm-receiving portion and a lower arcuate finger-supporting portion, said portions having an axially extending opening therebetween.

5. A hand manipulable glass cutter as claimed in claim 1, said handle having a unitary contoured palm-receiving portion and a finger-supporting portion, said portions converging to said shank.

6. A hand manipulable glass cutter as claimed in claim 1, said handle having an enlarged forward section adjacent to said shank and an enlarged rear section, and a contoured intermediate section between said forward and rear sections, said contoured intermediate section having a top palm substantially linear portion and an arcuate finger-receiving portion for gripping by the hand of a glass cutter user.

7. A hand manipulable glass cutter as claimed in claim 1, said shank, cutter housing and handle being integral.

8. A hand manipulable glass cutter as claimed in claim 1, an upwardly extending horn section projecting from said shank above said cutter housing for cooperatively receiving and retaining the tip of a glass cutter user's forefinger directly above said cutter housing with the user's forefinger being positioned along the shank of the glass cutter while the hand of the user engages said handle.

* * * * *